United States Patent [19]

Ueda et al.

[11] 4,118,724
[45] Oct. 3, 1978

[54] CAMERA WITH SELECTOR FOR EITHER ELECTROMAGNETIC RELEASE OR MECHANICAL RELEASE

[75] Inventors: Hiroshi Ueda, Nara; Takayoshi Miyamoto; Masatake Niwa, both of Sakai, all of Japan

[73] Assignee: Minolta Camera Kabushiki Kaisha, Azuchimachi, Japan

[21] Appl. No.: 837,139

[22] Filed: Sep. 28, 1977

[51] Int. Cl.$^2$ .................. G03B 17/38; G03B 17/42
[52] U.S. Cl. .................. 354/266; 354/204
[58] Field of Search ........... 354/204, 212, 226, 237, 354/266, 267, 268, 171, 173, 234, 235

[56] References Cited

U.S. PATENT DOCUMENTS

| 3,800,310 | 3/1974 | Umeda | 354/171 |
|---|---|---|---|
| 3,955,209 | 5/1976 | Akiyama | 354/234 |

FOREIGN PATENT DOCUMENTS

104,623 10/1974 Japan.

Primary Examiner—Michael L. Gellner
Attorney, Agent, or Firm—Wolder, Gross & Yavner

[57] ABSTRACT

A camera includes a stroke change-over member which is in first position and a second position respectively when a shutter dial is set for electric exposure control mode and for mechanical exposure control mode. The stroke change-over member, when in the first position, restricts the stroke of the movement of a mechanical release initiating member and, when in the second position, allows the movement of the mechanical release initiating member beyond the restricted stroke, the movement being caused by depression of a shutter button. The camera further includes an electromagnetic release initiating member movable from a first to a second position in response to the depression of the shutter button and a locking member for locking the electromagnetic release initiating member at the first position when the shutter dial is set for mechanical exposure control. The electromagnetic release initiating member allows an electromagnetic release device to release the shutter mechanism when moved a short distance before the movement of the mechanical release initiating member is restricted by the stroke change-over member. The mechanical release initiating member, when moved beyond the restricted stroke, serves to retain the locking of a winding member by another locking member, thereby preventing accidental winding of a film and charging of the shutter mechanism with the shutter button kept depressed as well as allows a mechanical release device to release the shutter mechanism.

11 Claims, 13 Drawing Figures

CAMERA WITH SELECTOR FOR EITHER ELECTROMAGNETIC RELEASE OR MECHANICAL RELEASE

BACKGROUND OF THE INVENTION

The present invention relates to an improved camera in which the shutter mechanism can be released either by an electromagnetic release device or by a mechanical release device in response to the depression of a common manual member.

A camera of the above type is described in U.S. Pat. No. 3,955,209 and includes a release member urged from a locked position to a rest position and adapted to release the shutter mechanism for an exposure when moved to the second position, and first and second locking mechanisms for locking the release member at its locked position respectively. The first locking mechanism is disabled by depression of the shutter button while the second locking mechanism is disabled when an electromagnet is excited in response to the depression of the shutter button or when a shutter dial is set for mechanical exposure control. Moreover, when the shutter dial is set for electric exposure control, depression of the shutter button causes the first locking mechanism to be disabled and at the same time causes excitation of the electromagnet to disable the second locking mechanism, thereby allowing the release of the shutter mechanism. On the contrary, when the shutter dial is set for mechanical exposure control, depression of the shutter button causes the first locking mechanism to be disabled, thereby allowing the release of the shutter mechanism since the second locking mechanism has been disabled by the setting of the shutter dial prior to the depression of the shutter button.

As is well known, as compared with a mechanical release device, an electromagnetic release device has general benefits in that it is only necessary for excitation of an electromagnet, i.e., for release of a shutter mechanism, to open or close a switch by depression of a shutter button, so that only a small force is required for the depression of the shutter button and that a stroke of the required depression is shortened. These benefits result in a reduced likelihood of blurring of the picture being taken. However, the above camera described in U.S. Pat. No. 3,955,209 does not enjoy such benefits of electromagnetic release because, even for electromagnetic release of the shutter mechanism, the shutter button must be depressed with the same stroke and force to disable the first locking mechanism.

SUMMARY OF THE INVENTION

It is, accordingly, an object of the present invention to provide a camera in which the shutter mechanism can be released for an exposure either by an electromagnetic release device or by a mechanical release device in response to the depression of a common manual member and which possesses the above benefits of electromagnetic release devices.

To accomplish the above object, the camera of the present invention includes a mechanical release initiating means movable in response to the depression of a manual release member and stroke restricting means for restricting the stroke of the movement of the mechanical release initiating means only when the release mode setting means is set for the electromagnetic release mode. The mechanical release initiating means is coupled with a mechanical release device so as to allow the same to release a shutter mechanism when it is moved beyond the restricted stroke. The camera further includes electromagnetic release initiating means movable from a first to a second position for operating an electromagnetic release device, in response to the depression of the release member, and a first locking means for locking the electromagnetic release initiating means at the first position when the release mode setting means is set for mechanical release mode. The stroke of the electromagnetic release initiating means from the first to the second position is determined in such a manner that the electromagnetic release device reaches the second position in response to the depression of the release member before the movement of the mechanical release initiating means is restricted by the stroke restricting means.

Thus, when the release member is depressed with the release mode setting means set for the electromagnetic release mode, the electromagnetic release initiating means moves to the second position, thereby allowing the electromagnetic release of the shutter mechanism by means of the electromagnetic release device while the mechanical release initiating means is moved only by the restricted stroke, thus failing to effect mechanical release of the shutter mechanism by means of the mechanical release device. On the contrary, when the release member is depressed with the release mode setting means set for the mechanical release mode, the mechanical release initiating means is moved beyond the restricted stroke, thereby allowing the mechanical release by means of the mechanical release device while the electromagnetic release initiating means remains locked by the first locking means, thus failing to effect the electromagnetic release by means of the electromagnetic release device.

Accordingly, with the above construction, the depression of the release member causes no locking mechanism to be disabled upon electromagnetic release of the shutter mechanism, so that only a small force is required to depress the release member. In addition, as the electromagnetic release initiating means allows the electromagnetic release device to release the shutter mechanism before the movement of the mechanical release initiating means is restricted by the stroke restricting means, a shorter stroke is required for depression of the release member in the case of the electromagnetic than in the case of the mechanical release.

The above and other objects and features of the present invention will become apparent from the following descriptions taken in conjunction with the accompanying drawings.

DESCRIPTION OF THE PREFERRED EMBODIMENTS

Referring now to the drawings which illustrate a preferred embodiment of the present invention as applied to a single lens reflex camera, there is shown at 1 a shutter speed dial provided on the top surface of a camera body in a rotatable manner and at 2 a cam plate rotatable integrally with the shutter speed dial, a pin 3 being provided on the back surface of the cam plate, and a pin 6 which is formed on a shutter control mode switching lever 5 supported by shaft 4 is urged against the periphery of cam plate 2 under the action of a spring (not shown). A release button 7 is slideably axially registered with the shutter speed dial 1. When release button 7 is depressed, a release plate 8 is lowered against the influence of a spring 13. Release plate 8 is guided by slots 11, 12, and slot engaging pins 9, 10, and is associated with release button 7 through the medium of a release shaft 7a which extends through cam plate 2 and abuts the top surface of release plate 8 serving as a mechanical release initiating means.

Figure 2:
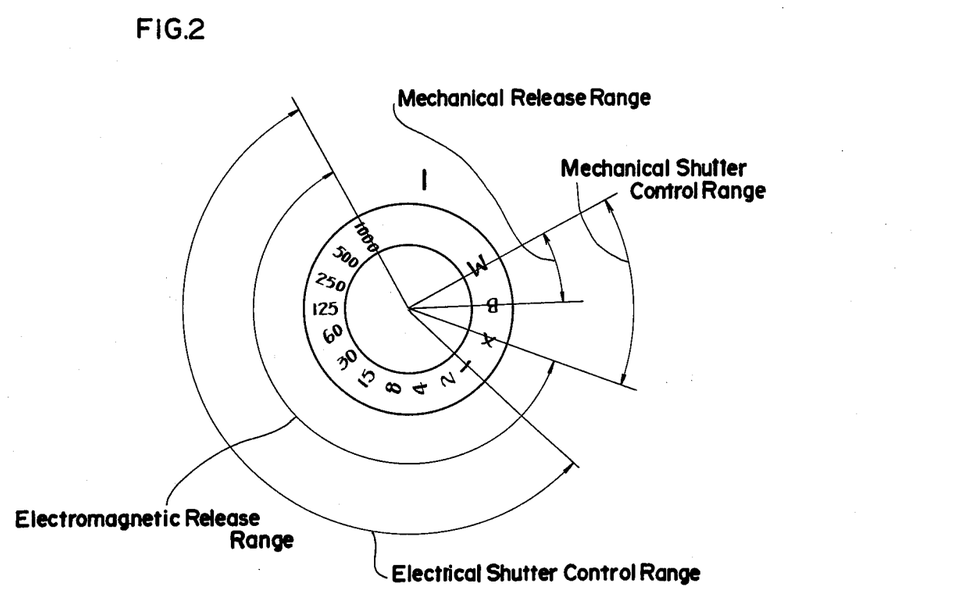
FIG. 2 is a plan view of a shutter dial.
Figure 3:
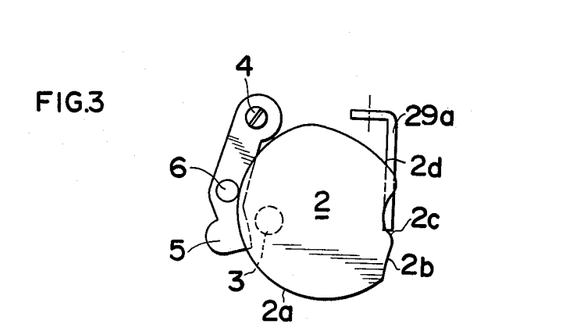
FIGS. 3 and 4 are plan views of a cam integral with the shutter dial, an exposure mode change-over lever and a stroke change-over lever, showing their relationship respectively in a condition of electric exposure control and in a condition of bulb photography.

Marked on shutter speed dial 1, as shown in FIG. 2, are figures such as 1000 to 1 which represent 1/1000 second to 1 second of shutter speeds, controlled electrically; a character X representing flash-photography shutter speed which is controlled mechanically; a character B representing mechanical bulb photography; and a character M representing another given shutter speed controlled mechanically. When any one of figures 1000 to 1 on the dial is set to an index (not shown), pin 6 abuts cam surface 2a of cam plate 2. On the other hand, when character X, B or M on dial 1 is set to the index, then pin 6 abuts cam surface 2b, 2c, or 2d of cam plate 2. Provided on the back surface of dial 1 is a slide resistor, whose resistance varies stepwise in accordance with shutter speeds to be controlled, represented by the figures 1000 to 1 on the dial, which is set to the aforesaid index. That is, depending on the resistance of the slide resistor, one of shutter speeds of 1/1000 to 1 second is selected by a known exposure control circuit (not shown).

Figure 5:
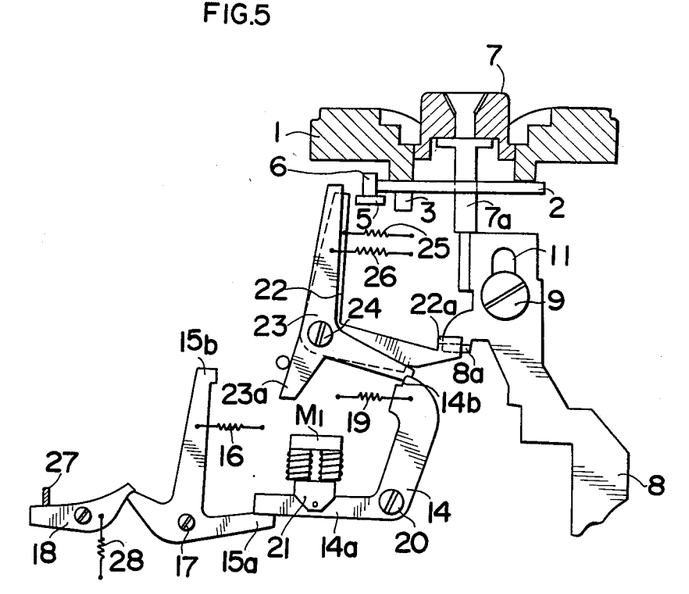
FIG. 5 is a front elevational view of a mechanical exposure control mechanism.

FIG. 5 shows the shutter control mechanism associated with the shutter-control-mode-changeover lever 5. Shown at 14 is a trailing-curtain locking lever and at 15 a leading-curtain drive lever. When film is wound or a shutter is cocked by means of a winding lever (not shown), then the leading-curtain drive lever 15 is rotated counterclockwise about a shaft 17 against the influence of a spring 16, and then locked by a leading-curtain locking lever 18, while its arm 15a pushes an arm 14a of trailing-curtain locking lever 14, thereby rotating lever 14 about a shaft 20 clockwise against the influence of spring 19. An armature 21 is supported on arm 14a of trailing-curtain-locking lever 14 in opposed relation to an electromagnet M1 connected to a known exposure control circuit. The clockwise rotation of lever 14 causes armature 21 to abut electromagnet M1. A bulb exposure lever 22 and a mechanical exposure lever 23 are both supported on a shaft 24 and are so loaded or biased as to rotate clockwise by means of springs 25 and 26 respectively. Bulb exposure lever 22 is formed with bent portion 22a adapted to abut bent portion 8a of release plate 8 maintained in its upper position. Thus, when shutter-control mode changeover lever 5 remains in a bulb exposure position, i.e., when pin 6 abuts cam surface 2c of cam plate 2, bulb exposure lever 22 is rotated clockwise due to the lowering of release plate 8, so as to engage stepped portion 14b of trailing-curtain-locking lever 14, which has been rotated to the position shown in the drawing due to the winding operation of a film. However, when the shutter-control-mode-changeover lever 5 is at another picture-taking position, i.e., when pin 6 abuts any one of cam surfaces 2a, 2b, 2d, of cam plate 2, bulb exposure lever 22 abuts shutter-control-mode-changeover lever 5, with the result that even if release plate 8 is lowered, lever 22 will not be rotated clockwise, and hence not engage the stepped portion 14b of trailing-curtain-locking lever 14. In contrast thereto, when shutter-control-mode-changeover lever 5 remains in a mechanical exposure control position, i.e., when pin 6 abuts either one of cam surfaces 2b, 2c, 2d of cam plate 2, mechanical exposure control lever 23 is maintained in engagement with stepped portion 14b of trailing-curtain-locking lever 14 all the time. However, when the trailing-curtain-drive lever 15 is released from the leading-curtain-locking lever 18, and hence lever 15 is rotated clockwise under the action of spring 16, arm 23a of lever 23 is pushed by arm end portion 15b of leading-curtain-drive lever 15, thereby releasing lever 23 from the engagement with stepped portion 14b. However, when the shutter-control-mode-changeover lever 5 is in an electric exposure control position, lever 23 is rotated counterclockwise by being pushed by the shutter-control-mode-changeover lever 5, and hence does not engage stepped portion 14a of trailing-curtain-locking lever 14 from the beginning.

The electromagnet M1 is connected to a battery E to be described hereinafter via a switch (not shown) adapted to be closed, only when shutter control-mode-changeover lever 5 is an electric exposure control position, and another switch (not shown) adapted to be closed in the initial phase of the lowering of release plate 8. When both switches are closed, the electromagnet M1 is excited to attract armature 21 and maintains same in position, and is de-energized under the action of a known exposure control circuit, after the lapse of a given period of time commensurate with a resistance of the aforesaid slide resistor but from the beginning of the travelling of a shutter-leading curtain, thereby releasing armature 21, i.e., trailing-curtain-locking lever 14. In addition, leading-curtain locking lever 18 is prevented from clockwise rotation caused by spring 28, by means of a leading-curtain-release lever 27 to be later described. When leading curtain release lever 27 is lowered in FIG. 5, then lever 18 is rotated counterclockwise, thereby releasing leading-curtain drive lever 15 from a locked condition.

Figure 1:
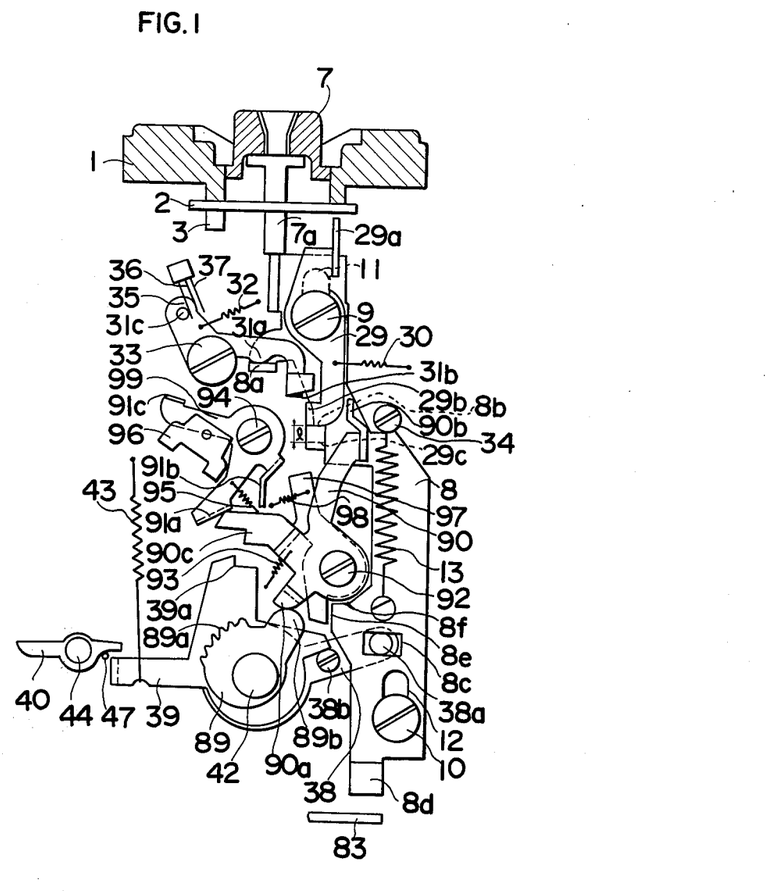
FIG. 1 is a front elevational view partly in section, showing an essential mechanism of a camera according to an embodiment of the present invention in a condition of electric exposure control.

As best seen in FIG. 1, a stroke-changeover lever 29 is supported by the pin 9, and biased so as to rotate counterclockwise by means of spring 30, while bent portion 29a formed on an arm thereof is positioned on the locus of rotating pin 3 on cam plate 2. More particularly, insofar as shutter-speed dial 1 is not rotated so as to set the figure 1000 to 1 or character X to the associated index, pin 3 on cam plate 2 does not abut bent portion 29a of stroke-changeover lever 29. However, when dial 1 is rotated to a position with the character B or M thereon set to the aforesaid index, then pin 3 on cam plate 2 pushes bent portion 29a, so that stroke-changeover lever 29 is rotated about pin 9 clockwise against the action of spring 30. Meanwhile, stroke-changeover lever 29 is formed with bent portion 29c on arm 29b. Bent portion 29c abuts the side edge of release plate 8, thereby limiting the counterclockwise rotation of stroke-changeover lever 29, while engaging the stepped portion 8b of release plate 8 in the course of the lowering of plate 8 but in a condition where bent portion 29c abuts the side edge of release plate 8, so that the extent to which release plate 8 may be lowered is limited. When stroke-changeover lever 29 is rotated clockwise by means of pin 3 as has been described earlier, then bent portion 29c is separated from the aforesaid side edge, to be offset from the moving locus of the stepped portion.

Shown at 31 is switch-actuating lever serving as an electromagnetic-release-starting means, lever 31 being biased to rotate clockwise about shaft 33 by means of a spring 32. Switch-actuating lever 31 has formed on an arm thereof a projecting portion 31a adapted to abut bent portion 8a of release plate 8, when release plate 8 is in its upper position abutting the pin 34, and with a bent portion 31b adapted to engage arm 29b of stroke changeover lever 29. Switch-actuating lever 31 is further formed on the other arm thereof with an electrically insulating pin 31c adapted to transfer or changeover switch contacts 35, 36, 37. When release plate 8 is lowered, then switch-actuating-lever 31 is rotated clockwise about a shaft 33 under the action of spring 32, following the lowering of release plate 8, so that insulating pin 31c causes switch contact 35 to contact switch contact 36, and then switch contact 36 to switch contact 37. However, when the stroke-changeover lever 29 is rotated clockwise by means of pin 3, bent portion 31b engages arm 29b, so that switch-actuating lever 31 is rotated clockwise through a small angle and stopped, while the insulating pin 31c only brings switch contacts 35 and 36 into contact with each other, while leaving switch contacts 36, 37 separated.

Figure 10:
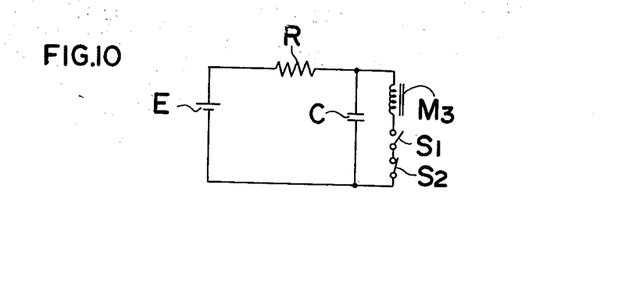
FIG. 10 is a schematic circuit diagram of an electromagnetic release device.

The switch contacts 35, 36 form a main switch for a known light measuring circuit (not shown). Thus, when contacts 35, 36 are brought into contact with each other, then there may be provided an indication of the optimum shutter speed depending on the measurement of light by an indicating means (not shown), such as a diameter. On the other hand, switch contacts 36, 37 form a switch S1 as shown in FIG. 10. When switch S1 is closed due to the contact of these contacts, the electromagnetic releasing operation is effected in a manner to be described later.

Shown at 38, 39, 40, 41 are lever mechanisms (FIGS. 1 and 8) which constitute a mechanical release device. Lever 38 is supported on shaft 42, and its arm is formed with a pin 38a engaging a slot 38c provided in release plate 8. Thus, when release plate 8 is lowered, then lever 38 is rotated clockwise due to pin 38a being pushed by release plate 8. Lever 39 is supported on shaft 42, and biased so as to rotate clockwise under the action of spring 43, while abutting another pin 38b on the arm of lever 38, following the clockwise rotation of lever 38. Levers 40 and 41 are supported on shafts 44 and 45, respectively and a spring 46 is secured to lever 41 so as to bias lever 41 to rotate counterclockwise as viewed in FIG. 8. Lever 40 abuts a pin 41a on lever 41, and is thus biased as to rotate clockwise as viewed in FIGS. 1 and 8 under the action of spring 46, being stopped by an abutting pin 47. One arm of lever 40 is positioned on the locus of the clockwise rotation of one arm of lever 39. Thus, when lever 39 is rotated clockwise, then lever 40 is rotated counterclockwise, and lever 41 is rotated clockwise. In addition, due to the clockwise rotation of lever 41, the bent portion 49a of a locking lever 49 which is adapted to lock drive lever 48 in its charged position may be pushed forwards. As has been described earlier, in the case where the extent to which release plate 8 is lowered is limited by stroke-changeover lever 29, the rotational angles of levers 38, 39, 40 and 41 are small, so that lever 41 fails to push bent portion 49a of locking lever 49.

Figure 8:
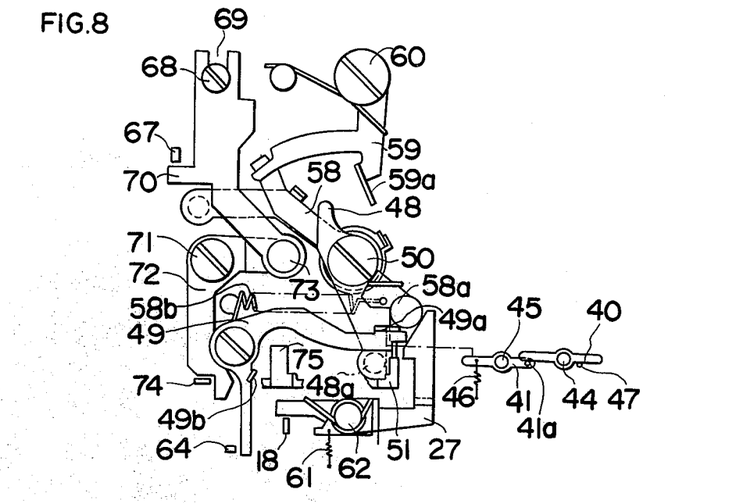
FIG. 8 is a side elevational view of another mechanism of the camera, disposed at a side wall of a mirror box not shown.
Figure 9:
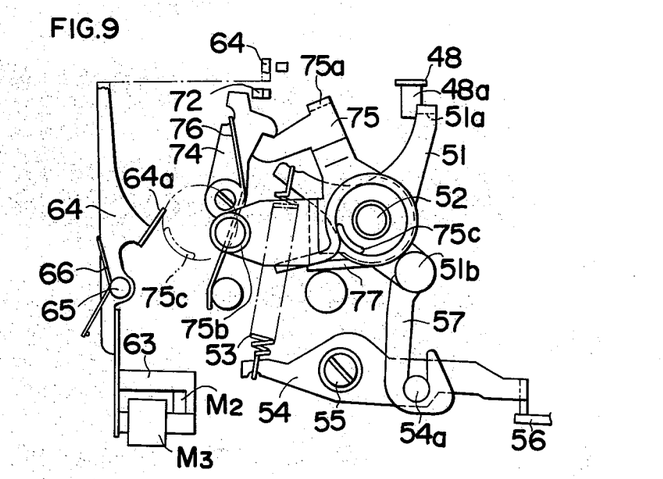
FIG. 9 is a bottom view of still another mechanism of the camera, disposed at the bottom wall of the mirror box.

FIG. 8 shows the mechanism disposed on the side wall of a mirror box (not shown). The drive lever 48 is supported on a shaft 50, and is formed at the tip of one arm with a pin 48a adapted to abut bent portion 51a of a diaphragm drive lever 51. Diaphragm drive lever 51 is supported on a shaft 52 as shown in FIG. 9, and biased to rotate counterclockwise as viewed in FIG. 9 under the action of a strong spring 53. When drive lever 48 is released from its locked condition due to locking lever 49, then drive lever 48 is rotated clockwise and diaphragm drive lever 51 is rotated counterclockwise under the action of spring 53, respectively. FIG. 9 shows the mechanism disposed on a bottom portion of a mirror box. Shown at 54 is diaphragm presetting lever which is loaded so as to rotate about a shaft 55 clockwise by means of spring 53, thereby normally maintaining the diaphragm operating pin 56 for an objective lens (not shown) in a position where the diaphragm is fully opened. However, diaphragm drive lever 51 and diaphragm presetting lever 54 are coupled to each other through the medium of hook member 57 pivoted by pin 51b on diaphragm drive lever 54 and adapted to engage pin 54a on diaphragm presetting lever 54. Thus, as has been described earlier, when diaphragm drive lever 51 is rotated counterclockwise, then diaphragm presetting lever 54 is rotated in the same direction as that of lever 51 so as to separate from diaphragm operating pin 56. As well known, diaphragm operating pin 56 is so loaded as to move in the direction to stop down the diaphragm, by means of a spring (not shown) which is positioned inwardly of the objective lens. Thus, when diaphragm presetting lever 54 is retracted, then pin 56 follows the retracting movement of lever 54, until the diaphragm is stopped down to a preset value established by a diaphragm setting member (not shown) inwards of the objective lens.

As shown in FIG. 8, a mirror drive lever 58 is supported in coaxial relation to drive lever 48. Mirror drive lever 58 is so loaded as to rotate clockwise by means of spring 58b, while pin 58a on one arm thereof abuts drive lever 48. Shown at 59 is a locking lever adapted to lock mirror drive lever 58 in its charged position. When drive lever 48 is rotated clockwise to abut bent portion 59a, then lever 59 is rotated about a shaft 60 counterclockwise, thereby releasing the locked condition. The aforesaid releasing operation is adjusted so as to take place after the diaphragm has been stopped down to a preset value due to the rotation of a diaphragm presetting lever 54. Shown at 27 is the aforesaid leading-curtain release lever, which is biased to rotate about shaft 62 counterclockwise by means of spring 61, thereby abutting pin 58a on mirror drive lever 58. When mirror drive lever 58 is rotated clockwise in a manner described earlier, then lever 27 is rotated counterclockwise following the rotation of lever 58 under the action of spring 61, and pushes leading-curtain-locking lever 18 shown in FIG. 5 to release leading-curtain-drive lever 15 from its locked condition, after a known mirror in a single lens reflex camera has been swung from its viewing position to its picture-taking position due to the clockwise rotation of mirror drive lever 58.

As seen in FIG. 9, there are provided a permanent magnet M2 and a solenoid or electromagnet M3 for use in an electromagnetic release, and secured to iron core 63. Electromagnet M3 is provided in an electric circuit shown in FIG. 10. Shown at E is a battery for common use with the aforesaid exposure control circuit (not shown), a series circuit of electromagnet M3, and switches S1 and S2, and capacitor C are connected across the battery E through resistor R. In this circuit, capacitor C is charged via resistor R, with switches S1 and S2 being opened. When switches S1 and S2 are closed, then capacitor C is discharged, so that electromagnet M3 is excited due to the discharge current therefrom. Description has been given of switch S1 earlier. Switch S2 is opened in the process of the film winding and shutter cocking operations, to be described later, and is adapted to be closed, when a winding lever (not shown) is returned to a winding starting position. Electromagnetic release lever 64 is supported on shaft 65, and is loaded so as to rotate clockwise by spring 66 and is normally maintained attracted to iron core 63 by the magnetic force of permanent magnet M2. However, when electromagnet M3 is excited, then the magnetic force of M2 is counteracted by the magnetic force of electromagnet M3 so that electromagnetic release lever 64 is released and rotated clockwise under the action of spring 66, so that locking lever 49 is rotated counterclockwise as viewed in FIG. 8 by means of an arm portion thereof which is opposed to one arm of the locking lever, thereby releasing drive lever 48 from locked condition.

Referring again to FIG. 8, a trailing-curtain-signal member 67 is released from its locked condition and hence lowered, when the shutter trailing curtain completes its travel. Operating plate 70 is provided in the locus of moving trailing-curtain-signal member, being guided by pin 68 and engaging a slot 69 in plate 70. Operating plate 70 is coupled to operating lever 72 supported on a shaft 71, through the medium of a pin 73, and moved so as to rotate operating lever 72 clockwise. A locking lever 74 locks returning drive lever 75 in position, as shown in FIG. 9, and is positioned on the locus of rotating operating lever 72, with return drive lever 75 locked in its charged position. On the other hand, when operating lever 72 is rotated clockwise as viewed in FIG. 8 locking lever 74 is advanced against the influence of a spring 76, and rotates counterclockwise as viewed in FIG. 9, thereby releasing return drive lever 75 from its locked condition. Return drive lever 75 is supported on the same shaft 52 as for diaphragm drive lever 51, and biased clockwise by means of a spring 77 stronger than spring 53. Pin 48a on drive lever 48, which has been rotated clockwise as viewed in FIG. 8 by diaphragm drive lever 51, is positioned in the locus of rotating bent portion 75a. In addition, return drive lever 75 is formed with a pin 75b adapted to abut a cam surface 78a of a winding releasing lever 78 shown in FIGS. 11 to 13, and a bent portion 79a of charge member 79. Return drive lever 75 is further formed with projecting portion 75c adapted to push bent portion 64a of electromagnetic release lever 64.

Figure 11:
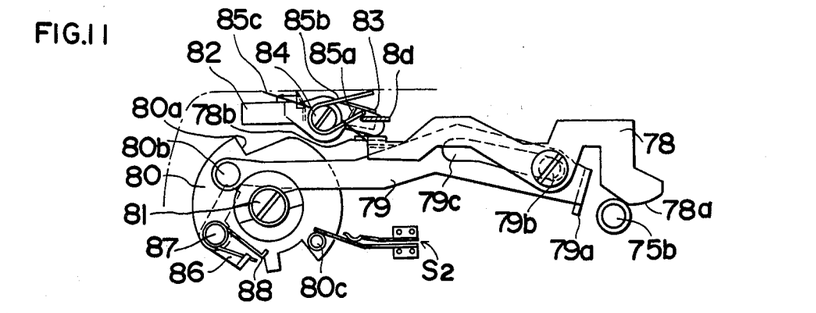
FIGS. 11 to 13 are plan views of a winding and charging mechanism and a winding stopping mechanism of the camera, showing their various operational conditions.
Figure 12:
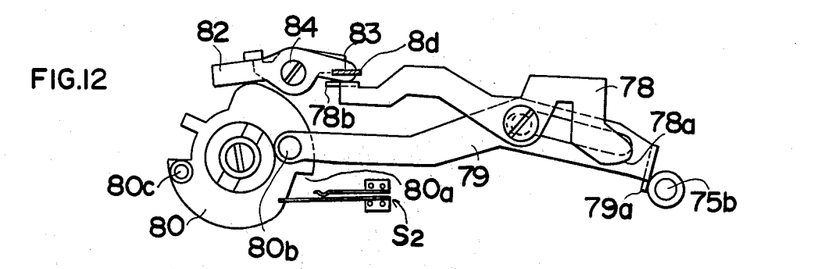
Figure 13:
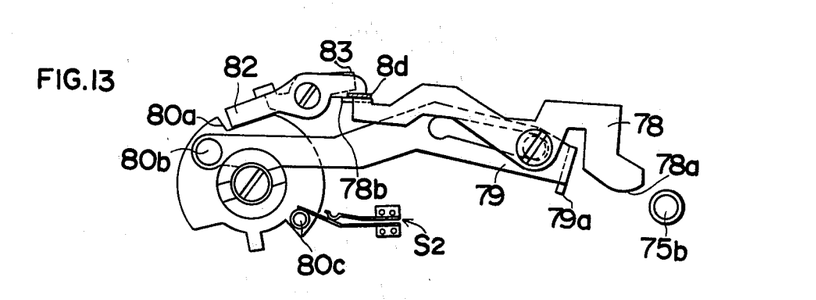

Referring to FIGS. 11 to 13, a winding cam 80 is supported on shaft 81 and rotates clockwise due to the operation of a winding operation lever (not shown), and returns to a home position before being wound as shown in FIG. 13, when the hand is removed from the winding operation lever. In addition, in case so-called automatic winder is mounted on a camera body, then winding cam 80 is coupled to the automatic winder, and rotated clockwise as in the case of rotation by means of a winding operation lever, and then returns to its initial position after each completion of one winding-up operation. Shown at 82 is winding-stopping lever, and at 83 is winding-stopping auxiliary lever. These levers 82 and 83 are both supported on shaft 84, and coupled together through the medium of a spring 85a. Winding stopping lever 82 is so biased as to rotate clockwise by means of spring 85b, while bent portion 78b of winding-stopping-operation releasing lever 78 biased to rotate counterclockwise by spring 85c abuts the tip of winding-stopping lever 82. When return drive lever 75 is in a locked position as shown in FIG. 9, winding stopping-lever 82 is pushed by bent portion 78b of winding-stopping-operation releasing lever 78 so as to rotate in a counterclockwise direction, and abuts the peripheral edge of winding cam 80. Then, when winding cam 80 is returned to a position shown in FIGS. 11 and 13, then winding stopping lever 82 engages a cut-away portion 80a in the winding cam, thereby disabling a repeated winding operation. When return drive lever 75 is rotated clockwise as seen in FIG. 9, and pin 75b thereof abuts cam surface 78a so as to rotate winding-stopping-operation releasing lever 78 counterclockwise, then winding stopping lever 82 is rotated clockwise, along with winding stopping auxiliary lever 83, so as to retract from cut-away portion 80a in winding cam 80, thereby allowing a successive winding operation.

When the release plate 8 is lowered beyond the extent limited by stroke changeover lever 29, the lower end 8d of release plate 8 projects between winding stopping auxiliary lever 83 and bent portion 78b of winding-stopping-operation releasing lever 78, thereby locking winding auxiliary lever 83 during the time, in which the release plate is lowered, so that there may be maintained engagement of winding stopping lever 82 with cut-away portion 80a in winding cam 80.

Charging member 79 is engaged at one end by pin 80b on winding cam 80, and guided proximate its opposite shaft 79b engaging a slot 79c in lever 79. When winding cam 80 is rotated clockwise, then bent portion 79a of charging member 79 pushes pin 75b, thereby rotating return drive lever 75 counterclockwise to its initial position as viewed in FIG. 9, against the influence of spring 77. Insulating pin 80c on winding cam 80 closes switch S2, when winding cam 80 is in its return position, and opens switch S2, when winding cam 80 is rotated clockwise. Shown at 86 is film winding coupling lever, which is supported on shaft 87 secured to winding cam 80, and coupled to a known film winding mechanism (not shown) with the aid of the force of a spring 88, so that lever 86 effects a film-winding operation, due to the clockwise rotation of winding cam 80. The shutter cocking mechanism is not shown. A shutter is cocked due to the rightward travelling of cocking member 79, together with the shutter leading-curtain and trailing curtain.

As seen in FIG. 1 a gear or rack 89 has teeth 89a and a radial projection or arm 89b on its periphery, and is supported on shaft 42 coaxial with levers 38 and 39. Gear 89 is rotated from the position shown in FIG. 1 to the position shown in FIG. 7 with a self-timing-photography setting operation. Self-release locking lever 90 is formed with an arm 90a adapted to abut projection 89b of gear 89, a bent portion adapted to abut bent portion 29c of stroke changeover lever 29 and adapted to project under bent portion 31b of switch actuating lever 31, and an arm 90c adapted to abut a bent portion 91a of an ankle locking lever 91. Lever 90 is supported on a shaft 92, and biased to rotate counterclockwise by a spring 93 and to rotate counterclockwise, when gear 89 is rotated to the position shown in FIG. 7, so that bent portion 90b rotates stroke-changeover lever 29 clockwise, thereby allowing bent portion 90b and arm 29b of stroke-changeover lever 29 to enter under bent portion 31b of switch actuating lever 31, while arm 90c engages stepped portion 39a of lever 39. Ankle locking lever 91 is biased to rotate counterclockwise about shaft 94 by means of a spring 95, and rotates counterclockwise, when self-release locking lever 90 is rotated counterclockwise, thereby advancing an ankle 96 against the first gear in a gear train, (not shown), which meshes with teeth 89a of gear 89, thereby preventing the counterclockwise rotation of gear 89 due to the force of a spring (not shown). A self-release starting lever 97 supported on shaft 92 with self-release locking lever 90 is biased so as to rotate counterclockwise by spring 98, and abuts arm 90c of self-release locking lever 90. Thus, when self-release locking lever 90 is rotated counterclockwise in the aforesaid manner, then lever 97 is rotated counterclockwise to abut convex portion 8e of release plate 8. When release plate 8 is lowered, then self-release starting lever 97 is further rotated counterclockwise to engage a stepped portion 8f of release plate 8, thereby preventing the upward returning movement of release plate 8 by means of spring 13, while pushing another bent portion 91b on ankle locking lever 91, thereby rotating ankle locking lever 91 clockwise against the action of spring 95, thereby releasing the first gear from ankle 96.

An explanation of the operation of the mechanism described above is hereinafter given with reference to three cases of exposure control, by means of an electric shutter, exposure control by means of a mechanical shutter, and self-timer photography.

(1) Exposure control by means of electric shutter;

When one of figures 1000 to 1 on shutter speed dial 1 is set to the index (not shown) on the camera body, then pin 6 abuts cam surface 2a of the cam plate 2, and the shutter-control-mode-changeover lever 5 closes a switch (not shown), thereby enabling excitation of electromagnet M1, while rotating bulb exposure lever 22 and mechanical exposure control lever 23 counterclockwise as viewed in FIG. 5, against the influence of springs 25 and 26, for preventing clockwise rotation of bulb exposure lever 22, and releasing trailing-curtain-locking lever 14 from its locked condition by mechanical exposure control lever 23. At this time, pin 3 on cam plate 2 does not abut bent portion 29a of stroke changeover lever 29, so that stroke changeover lever 29 causes bent portion 29c to abut the side edge of release plate 8 so as to stop in the position shown in FIG. 1.

When release button 7 is depressed under the aforesaid condition, then release plate 8 is lowered by way of release shaft 7a. Then, a main switch (not shown) is closed, so that electromagnet M1 is excited so as to attract armature 21 and maintain the same in advance position. On the other hand, switch actuating lever 31 is rotated clockwise under the action of spring 32, because bent portion 8a of release plate 8 is lowered, whereupon lever 38 as well is rotated clockwise due to slot engaged pin 38a being lowered by release plate 8. Due to the clockwise rotation of lever 38, lever 39 is rotated clockwise, lever 40 is rotated counterclockwise, and lever 41 is rotated clockwise. However, when release plate 8 is lowered a distance (l), then stepped portion 8b abuts bent portion 29c of stroke changeover lever 29, with the result that release plate 8 can be further lowered, so that the amounts of rotation of levers 38, 39, 40 and 41 are limited. As a result, lever 41 fails to push bent portion 49a of locking lever 49 to release drive lever 48 from a locked condition.

On the other hand, due to the clockwise rotation of switch actuating lever 31, switch contact 35 is advanced to contact switch contact 36 by insulating pin 31c, and switch contact 36 is advanced to contact switch contact 37.

As a result an optimum shutter speed depending on the measurement of light is indicated by an indicating means (not shown), such as a meter, while switch S1 is closed in FIG. 10, so that capacitor C is discharged via switches S1 and S2 and electromagnet M3, and thus electromagnet M3, is excited. Switch S2 is kept closed at this time since the film winding and shutter charging operations have been completed and hence the winding cam is returned to a position in FIG. 13. Then, electromagnetic release lever 64 is rotated clockwise in FIG. 9, under the action of spring 66, to engage locking lever 49, and rotate it counterclockwise as viewed in FIG. 8. As a result, drive lever 48 is released from a condition locked by locking lever 49, and diaphragm drive lever 51 is rotated counterclockwise as viewed in FIG. 9, under the action of spring 53, so that pin 48a on drive lever 48 is urged against bent portion 51a of diaphragm drive lever 51, so that drive lever 48 is rotated clockwise as viewed in FIG. 8. Meanwhile, due to the rotation of diaphragm drive lever 48, a switch (not shown) provided in parallel with a main switch adapted to be closed due to the lowering of release plate 8 is so designed as to be closed, so that even if release plate 8 is lifted thereafter, electromagnet M1 is maintained in an excited condition. In addition, due to the counterclockwise rotation of diaphragm drive lever 51, diaphragm presetting lever 54 is likewise rotated counterclockwise, and then diaphragm operating pin 56 follows the aforesaid counterclockwise rotation so as to advance until the diaphragm is set to a given preset value. On the other hand, drive lever 48 abuts the bent portion of 59a of locking lever 59 in the course of clockwise rotation thereto to rotate locking lever 59 counterclockwise, thereby releasing mirror drive lever 58 from a locked condition. Then, mirror drive lever 58 is spring rotated clockwise so that a mirror (not shown) may be swung up from its viewing position to its picture-taking position. In addition, leading-curtain release lever 27 follows the movement of pin 58a on mirror drive lever 58 so as to rotate counterclockwise under the action of spring 61, thereby rotating leading-curtain-locking lever 18 counterclockwise as viewed in FIG. 5.

When leading-curtain-locking lever 18 is rotated counterclockwise as viewed in FIG. 5, then leading-curtain drive lever 15 is released from a condition locked by lever 18, so as to rotate clockwise under the action of spring 16, thereby allowing the shutter leading curtain (not shown) to travel. Trailing-curtain locking lever 14 is released from a condition locked by lever 15 due to the clockwise rotation of leading-curtain-drive lever 15. However, at this time, electromagnet M1 attracts armature 21, so that lever 14 does not rotate counterclockwise.

On the other hand, simultaneously with the beginning of travel of the shutter-leading curtain, a known exposure control circuit begins operating. When a period of time commensurate with the sliding resistance determined by the setting of shutter speed dial 1 is lapsed, then electromagnet M1 is de-energized, losing its attracting force. Then, trailing-curtain-locking lever 14 is rotated counterclockwise, along with armature 21, under the action of spring 19, so that the shutter-trailing curtain (not shown) travels, thereby completing exposure. When the shutter-trailing curtain completes its travel, trailing-curtain-signal member 67 begins lowering as seen in FIG. 8 so as to engage operating plate 70 to advance it downwards, while operating lever 72 is rotated clockwise, thereby rotating locking lever 74 counterclockwise as viewed in FIG. 9. As a result, return drive lever 75 is released from the condition locked by locking lever 74, and rotated clockwise under the action of spring 77, thereby pushing pin 48a on drive lever 48 by means of bent portion 75a, cam surface 78a of winding-stopping-operation-releasing lever 78 by means of pin 75b, and bent portion 64a of electromagnetic release lever 64 by means of projection 75c, respectively.

Due to bent portion 64a being pushed by projecting portion 75c, electromagnetic release lever 64 is rotated counterclockwise to abut iron core 63. Following the counterclockwise rotation of electromagnetic release lever 64, locking lever 49 is spring rotated clockwise so as to return to the initial position. On the other hand, due to bent portion 75a being engaged by pin 48a, drive lever 48 is rotated counterclockwise to push pin 58a, so that mirror drive lever 58 is rotated counterclockwise, after which drive lever 48 is locked again by means of locking lever 49 which has been rotated so as to return to its initial position. Due to the counterclockwise rotation, the mirror drive lever 58 as well is locked again by means of locking lever 59, so that leading-curtain-release lever 37 is pushed by pin 58a to rotate clockwise so as to return to its initial position against the action of spring 61. In addition, diaphragm drive lever 51 which abuts pin 48a is rotated clockwise in line with the clockwise rotation of drive lever 48, while tensioning spring 53. In addition, diaphragm presetting lever 54 as well is rotated clockwise under the action of spring 53, thereby pushing diaphragm operating pin 56 to bring the diaphragm in its fully open position.

Winding-stopping-operation releasing lever 78, whose cam surface 78a is pushed by pin 75b, is rotated counterclockwise from a position shown in FIG. 13 to the position shown in FIG. 11. As a result, winding-stopping lever 82 is rotated clockwise, along with the winding stopping auxiliary lever 83, under the action of spring 85b so as to retract from cut-away portion 80a in winding cam 80, thereby permitting the clockwise rotation of winding cam 80, i.e., its winding by means of a winding lever (not shown).

Thereafter, when the winding lever is operated so as to rotate winding cam 80 clockwise, the charging member 79 advances to the right to push pin 75b, thereby rotating return drive lever 75 counterclockwise as viewed in FIG. 9, while charging spring 77. As a result, return drive lever 75 is again locked by locking lever 74, so that bent portion 75a and projecting portion 75c are disengaged respectively from pin 48a and bent portion 64a. In addition, pin 75b is also disengaged from cam surface 78a, so that winding-stopping-operation releasing lever 78 is rotated clockwise under the action of spring 85c, thereby allowing winding-stopping lever 82 to abut the periphery of winding cam 80.

In addition, the clockwise rotation of winding cam 80 causes switch S2 to open. As a result, even in case the release button 7 still remains depressed at this time and switch S1 is closed, electromagnet M3 is de-energized, whereupon capacitor C1 is charged again.

After the completion of the film winding and shutter cocking operations, the hand is withdrawn from the winding operating lever so as to allow it to return to its winding starting position, so that winding cam 80 is rotated counterclockwise to return to its initial position shown in FIG. 13. Winding lever 82 which abuts the periphery of winding cam 80 to rotate into engagement with cut-away portion 80a, thereby preventing the clockwise rotation of winding cam 80, and hence any inadvertent repeated film winding operation and cocking of a shutter. In addition, since switch S2 is closed, when release button 7 is again depressed, then a subsequent shutter releasing operation may be initiated, simultaneously with the closing of switch S1. It is when winding cam 80 is returned to its initial position that switch S2, which has been opened, is again closed. Therefore even if release button 7 is continuously depressed in the course of film winding and shutter cocking operations, there is no possibility of a shutter releasing operation being inadvertently performed.

Meanwhile, in case the film winding and shutter cocking operations are accomplished by using an automatic-winder mounted on the camera, then continous photography becomes possible by continuously depressing release button 7. As has been described earlier, immediately after the completion of exposure, winding cam 80 is released from its locked condition, thereby enabling the succeeding film winding operation as well as shutter cocking operation, after which switch S2 is opened during the film winding and shutter cocking operations, so that capacitor C is charged again. Accordingly, after the completion of the film winding and shutter cocking operations, the moment winding cam 80 is returned to its initial position, the subsequent shutter releasing operation may be accomplished due to the closing of switch S2.

(2) Exposure control by means of the mechanical shutter;

When character B or M on shutter speed dial 1 is set to the index on the camera body, then mechanical release is available. When the character X therein is set to the index, electromagnetic release becomes possible as in the same manner as that of the aforesaid electric shutter.

Figure 6:
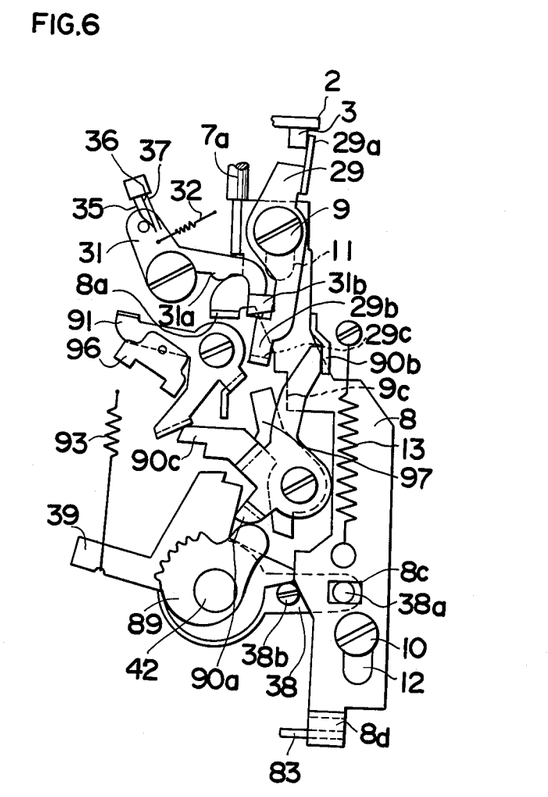
FIG. 6 is a view similar to FIG. 1, showing the essential mechanism in a condition of mechanical exposure control.

To begin with, when character B or M on shutter speed dial 1 is set to the index, then pin 6 abuts cam surface 2c or 2d of cam plate 2. Then, the pin 3 on cam plate 2 pushes bent portion 29a of stroke changeover lever 29, thereby rotating lever 29 clockwise as shown in FIG. 6. As a result, arm 29b of stroke changeover lever 29 advances under bent portion 31b of switch actuating lever 31, while bent portion 29c thereof is withdrawn from the side edge of release plate 8 so as to retract from the moving locus of stepped portion 8b of release plate 8.

Figure 4:
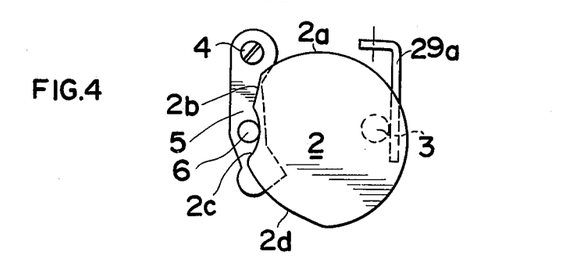

Moreover, when pin 6 abuts cam surface 2c of cam plate 2, shutter-control-mode changeover lever 5 is rotated to the positions shown in FIG. 4 and 5, thereby allowing the clockwise rotation of bulb exposure lever 22. On the other hand, when pin 6 abuts cam surface 2d of cam plate 2, shutter-control-mode-changeover lever 5 abuts bulb exposure lever 22 positioned as shown in FIG. 5, thereby preventing the clockwise rotation of lever 22.

After the aforesaid setting of shutter speed dial 1, when release button 7 is depressed, then switch actuating lever 31 is slightly rotated clockwise, following the lowering of release plate 8, so that bent portion 31b abuts arm 29b of stroke changeover lever 29, thereby interrupting the rotation thereof. As a result, switch contact 35 contacts switch contact 36, while switch contact 36 fails to contact switch contact 37, so that switch S1 is maintained opened and electromagnet M3 is not excited, and electromagnetic release lever 64 is maintained attracted to iron core 63.

Meanwhile, stepped portion 29c of stroke changeover lever 29 is retracted out of the moving locus of stepped portion 8b, so that release plate 8 may be lowered beyond a predetermined distance (l). When release plate 8 is lowered beyond the distance (l), levers 38, 39 are rotated clockwise, lever 40 is rotated counterclockwise, and the lever 31 pushes bent portion 49a of locking lever 49, thereby rotating locking lever 49 counterclockwise against the action of spring 49b so as to release drive lever 48 from its locked condition.

As a result, the stop-down operation and mirror swinging operations may be performed in the same manner as that of exposure control by means of the electric shutter, after which leading-curtain drive lever 15 is rotated clockwise as viewed in FIG. 5, so that the shutter leading curtain travels. Leading-curtain-drive lever 15 adapted to rotate clockwise as viewed in FIG. 5 pushes arm 23a of mechanical-exposure-control lever by means of arm end portion 15b after a predetermined lapse of time, thereby rotating lever 23 counterclockwise against the influence of spring 26, and releasing trailing-curtain-locking lever 14 from the condition locked by lever 23. When pin 6 abuts cam surface 2c or 2d of cam plate 2, a switch (not shown) provided between electromagnet M1 and battery E is opened by means of shutter-control-mode-changeover lever 5, so that electromagnet M1 is not excited. Accordingly, when pin 6 abuts the cam surface 2d of cam plate 2, i.e., in the case where character M on shutter speed dial 1 is set to the index on the camera body, then trailing-curtain-locking lever 14 is released from the condition locked by mechanical exposure control lever 23, whereupon lever 14 is rotated counterclockwise under the action of spring 19, thereby allowing the shutter trailing curtain to travel. In other words, under these conditions, the shutter speed is determined by the distance between arm end portion 15b of leading-curtain drive lever 15 and arm 23a of mechanical exposure control lever 23. In contrast thereto, in case pin 6 abuts cam surface 2c of cam plate 2, i.e., where character B on shutter speed dial 1 is set to an index on a camera body, bulb exposure lever 22 is rotated clockwise, following the lowering of release plate 8, so as to engage stepped portion 14b of trailing-curtain-locking lever 14, so that trailing-curtain-locking lever 14 can not be rotated counterclockwise merely due to the counterclockwise rotation of mechanical exposure control lever 23, with the result that release plate 8 is returned to its upper position, and bent portion 8a thereof lifts bent portion 22a of bulb exposure lever 22, thereby rotating lever 22 counterclockwise to the position shown in FIG. 5. The mechanical exposure control lever 23 then starts to rotate counterclockwise. In other words, in this case, bulb photography may be performed.

The operation of the respective parts and the film winding and shutter cocking operations after the completion of an exposure are the same as those in the case of exposure control by means of an electric shutter. This is not true, however, in the case where the film winding and shutter cocking operations are performed, with the release plate 8 maintained lowered as will be hereunder described.

More specifically, when release plate 8 is maintained lowered, then lower end portion 8d thereof projects between winding-stopping lever 82 and winding-stopping auxiliary lever 83. Thus, even when pin 75b on return drive lever 75 pushes cam surface 78a of winding-stopping-operation releasing lever 78, thereby rotating lever 78 counterclockwise from a position shown in FIG. 13 winding stopping lever 82 fails to rotate clockwise so as to be disengaged from cut-away portion 80a in the winding cam 80 because winding stopping auxiliary lever 83 is engaged with lower end portion 8d of release plate 8. Accordingly, even if the winding lever is inadvertently operated, with release button 7 depressed, the film winding and shutter cocking operations are not possible, thereby preventing inadvertent repeated exposure. In this case, however, when release plate 8 returns to its upper position, the lower end portion 8d thereof is disengaged from winding-stopping-auxiliary lever 83, then the release of winding cam 80 from winding-stopping lever 82 becomes possible.

On the other hand, when character X on shutter speed dial 1 is set to the index on the camera body, then pin 6 abuts cam surface 2b of cam plate 2, and pin 3 on cam plate 2 does not push bent portion 29a of stroke changeover lever 29. Accordingly, the amount of the release plate 8 can be lowered is limited in the same manner as that of exposure control by means of an electric shutter, while switch actuating lever 31 may be rotated to a position to close switch S1, following the lowering movement of release plate 8, whereupon releasing operation is commenced due to the excitation of electromagnet M3. Since pin 6 abuts cam surface 2b of cam plate 2, shutter-control-mode-changeover lever 5 rotates bulb exposure lever 22 and mechanical exposure control lever 23 counterclockwise as viewed in FIG. 5. In this case, however, the extent of counterclockwise rotation of mechanical exposure control lever 23 is small, so that the stepped portion 14b of trailing-curtain-locking lever 14 is maintained engaged with mechanical exposure control lever 23.

In the aforesaid condition, the shutter releasing operation is commenced due to the excitation of electromagnet M3, so that leading curtain drive lever 15 is rotated clockwise as viewed in FIG. 5 to push arm 23a of mechanical exposure control lever 23 by means of its arm portion 15b, a given period of time after the commencement of travelling of the shutter leading curtain, so that lever 23 is rotated counterclockwise, thereby releasing lever 23 from a condition locked by trailing-curtain-locking lever 14. As a result, the shutter-trailing-curtain travels and exposure is completed. In this case, electromagnet M1 remains unexcited to fail to hold trailing-curtain locking lever 14 because the aforesaid (not shown) switch is opened by means of lever 5. Meanwhile, the distance between arm end portion 15b of leading-curtain drive lever 15 and arm 23a of mechanical exposure control lever 23 is so preset as to obtain a shutter speed suited for flash photography by means of cam surface 2b of cam plate 2.

For permitting continuous flash photography by means of automatic-winder mounted on the camera body, the camera is adapted to initiate the shutter releasing operation due to excitation of electromagnet M3 in the aforesaid manner, when a shutter speed suited for flash photography is obtained. Stated differently, in the case of electromagnetic release, as has been described earlier with reference to exposure control by means of an electric shutter when release button 7 is kept depressed, the subsequent releasing operation is commenced due to the closing of switch S2 at the time when winding cam 80 is returned to its initial position, after the completion of shutter cocking and film windng operations. In contrast thereto, in the case of the mechanical release by means of levers 38, 39, 40 and 41, film winding and shutter cocking operations are not possible even after an exposure and hence continuous photography is not achieved, unless the hand is withdrawn from the release button 7, and then release plate 8 is brought to its upper position.

It is inconvenient that one cannot perform flash photography, in case battery E is consumed and the shutter releasing operation is disabled by means of electromagnet M3. To avoid this shortcoming, a shutter speed obtained when setting character M on shutter speed dial 1 to the index on the camera body, should be selected so as to be suited for flash photography. However, there is a certain range of variation in shutter speed suited for flash photography, so that the shutter speed in this case should not necessarily be set to the same shutter speed as obtained when setting character X on shutter speed dial 1 to the index.

Figure 7:
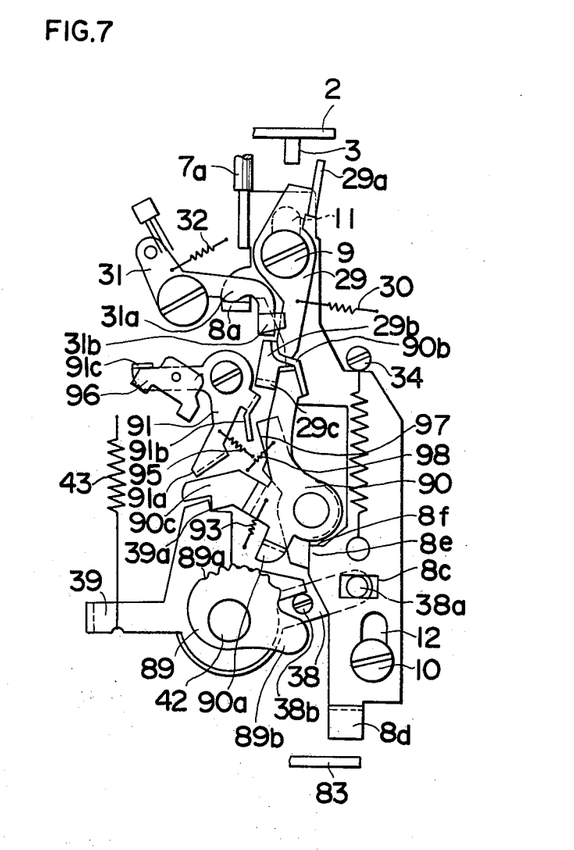
FIG. 7 is a view similar to FIGS. 1 and 6, showing the essential mechanism in a condition of a self-timer photography.

(3) Self-timer photography;

When gear 89 is rotated clockwise as viewed in FIG. 7 by operating a self-timer-photography-setting member (not shown), self-release-locking lever 90 is rotated counterclockwise under the action of spring 93, so that arm 90c therefore abuts stepped portion 39a of lever 39. On the other hand, bent portion 90b of self-release locking lever 90 pushes bent portion 29c so as to rotate stroke-changeover lever 29 clockwise, thereby allowing both bent portion 90b and arm 29b of stroke changeover lever 29 to enter under bent portion 31b of switch actuating lever 31. Following the counterclockwise rotation of self-release locking lever 90, self-starting lever 97 is rotated counterclockwise under the action of spring 98 so as to abut convex portion 8e of release plate 8, whereupon ankle locking lever 91 as well is rotated counterclockwise under the action of spring 95, thereby causing bent portion 91c to contact ankle 96, and urging the ankle against the first gear in a gear train (not shown) meshing with teeth 89a on gear 89. As a result, the aforesaid gear train cannot be rotated, and gear 89 as well is stopped in a position shown in FIG. 7 against the action of a spring not shown.

When released button 7 is depressed under the above conditions, and the release plate 8 is lowered, then switch actuating lever 31 is rotated slightly clockwise, while bent portion 31b thereof abuts bent portion 90b of self-release-locking lever and arm 29b of stroke-change-over lever 29, thereby stopping the rotation thereof. As a result, switch S1 is maintained in an open condition, and electromagnet M3 remains de-energized. In this respect, since stroke-changeover lever 29 remains in a clockwise rotated position, release plate 8 is lowered beyond the distance (l), thereby rotating lever 38 clockwise through a large angle. At this time, since lever 39 abuts arm 90c of self-release locking lever 90 by means of stepped portion 39a, the lever 38 will not follow the rotation of lever 38. On the other hand, when release plate 8 is lowered beyond the distance (l), then self-starting lever 97 is shifted from convex portion 8e to stepped portion 8f, thereby preventing the upward return movement of release plate 8. In addition, when self-starting lever 97 is rotated counterclockwise, bent portion 91b is pushed by lever 97, so that ankle locking lever 91 is rotated clockwise, thereby releasing ankle 96. As a result, ankle 96 releases the first gear in a gear train (not shown), so that gear 89 is rotated, along with the gear train under the action of a spring (not shown) under the braking action of ankle 96, so that projecting portion 89b thereof pushes arm 90a of self-release locking lever 90, thereby rotating lever 90 clockwise against the action of spring 93. Then, arm 90c of self release locking lever 90 is retracted from stepped portion 29a, so that lever 39 is rotated clockwise under the action of spring 43, so as to abut pin 38b on lever 38, thereby rotating lever 40 counterclockwise, and lever 41 clockwise through a large angle. As a result, lever 41 pushes bent portion 49a of locking lever 49, thereby rotating locking lever 49 counterclockwise for releasing the drive lever from locked condition.

Meanwhile, when self-release locking lever 90 is rotated clockwise, self-starting lever 97 is pushed by arm 90c of lever 90 to rotate clockwise, thereby retracting from stepped portion 8f of release plate 8. Accordingly, release plate 8 is returned upwards under the action of spring 13, while switch actuating lever 31, and stroke changeover lever 29 as well are returned to the positions shown in FIG. 1.

In the case of self-timer photography, drive lever 48 is released from a condition locked by means of lever 41. In this case, the aforesaid releasing operation has no bearing upon which one of mechanical shutter device and electric shutter device is selected. This is because, irrespective of whether pin 3 pushes bent portion 29a of stroke changeover lever 29, stroke changeover lever 31 is rotated clockwise by means of self release locking lever 90, thereby permitting release plate 8 to be lowered beyond the distance (l), while the clockwise rotation of switch actuating lever 31 is limited by stroke changeover lever 29 and self-release locking lever 90, thereby maintaining switch S1 in an open condition. Accordingly, in this embodiment, in case battery E is not consumed, then self-timer photography may be taken with an electric shutter device. If batter E is consumed, then self-timer photography is taken by means of the mechanical shutter device. Thus, consumption of battery E has no bearing on the accomplishment of self-timer photography.

While a description has been given of one embodiment of the present invention in conjunction with the accompanying drawings, the present invention is by no means limited to the aforesaid embodiment. For instance, according to the aforesaid embodiment, in case character X on shutter speed dial 1 is set to an index on a camera body, a shutter speed suited for flash photography may be obtained by a mechanical shutter device. This however may be replaced by an electric shutter device. Then, in case the electric shutter device is selected, except for the case of self timer photography, electromagnetic release is effected. On the other hand, in case a mechanical shutter device is selected, then the mechanical release is effected. In addition, in case the camera is not intended to be used with an automatic winder, even when character X on shutter speed dial 1 is set to an index on the camera body, it is possible to effect mechanical release instead of electromagnetic release. In addition, according to the aforesaid embodiment, exposure control is accomplised according to the control of the shutter speed. However, exposure control may be accomplished according to the control of a diaphragm aperture. In addition, according to the aforesaid embodiment, in case mechanical exposure control is selected, the electromagnet M1 is not excited at all. Alternatively, electromagnet M1 may be connected to battery E only via a switch adapted to be closed in the initial phase of the lowering movement of release plate, while the slide resistor provided on the back surface of dial 1 may be so arranged as to be set to a resistance adapted to provide a shutter speed of extremely short time when character X, B or M on shutter speed dial 1 is set to one index on the camera body, so that electromagnet M1 may be excited for an extremely short period of time in the course of the lowering of release plate 8.

We claim:

1. In a camera including:
   a shutter mechanism;
   a manually operable release member;
   a mechanical release device for releasing said shutter mechanism for an exposure in response to the depression of said release member;
   an electromagnetic release device for releasing said shutter mechanism for an exposure in response to the depression of said release member;
   manually operable release modes setting means; and a release modes selecting device coupled with said setting means and said release devices for selectively enabling either one of said release devices in accordance with the setting of said setting means, the improvement comprising:
   electromagnetic release initiating means movable from a first to a second position in response to the depression of said release member, for operating said electromagnetic release device;
   mechanical release initiating means movable along a predetermined path in response to the depression of said release member for operating said mechanical release device;
   first locking means for locking said electromagnetic release initiating means when said modes setting means is set for mechanical release mode; and
   stroke restricting means for restricting the stroke of the movement of said mechanical release initiating means when said modes setting means is set for electromagnetic release mode, said mechanical release device being coupled with said mechanical release initiating means so as to be operated for release of said shutter mechanism only when said mechanical release initiating means is moved beyond the restricted stroke, and the stroke of said electromagnetic release initiating means from the first to the second position being such that said electromagnet release initiating means reaches the second position in response to the depression of said release member before said movement of said mechanical release initiating means is restricted by said stroke restricting means.

2. The improvement as defined in claim 1, wherein said first locking means and said stroke restricting means include a common lever swingable between a first and a second position in accordance with the setting of said modes setting means, said swingable lever when in the first position locking said electromagnetic release initiating means and permitting said mechanical release initiating means to be moved beyond the restricted stroke when said modes setting means is set for mechanical release mode and when being in the second position unlocking said electromagnetic release initiating means restricting the stroke of the movement of said mechanical release initiating means when said modes setting means is set for electromagnetic release mode.

3. The improvement as defined in claim 1, wherein said electromagnetic release initiating means is in abutment with said mechanical release initiating means so as to follow said mechanical release initiating means when said mechanical release initiating means is moved in response to the depression of said release member.

4. The improvement as defined in claim 1, wherein said electromagnetic release device includes:
   a battery;
   a capacitor chargable by current from said battery;
   an electromagnet connected to the opposite terminals of said capacitor;
   an actuating member for releasing said shutter mechanism due to the excitation of said electromagnet; and
   a first switch connected between said capacitor and said electromagnet and closed when said electromagnetic release initiating means is in the second position.

5. The improvement as defined in claim 4, further comprising a winding member movable from an initial to a terminal position for winding-up a film and charging said shutter mechanism wherein said electromagnetic release device further includes a second switch connected in series with said first switch and closed only when said winding member is in the initial position.

6. The improvement as defined in claim 1, further comprising:
   a mechanical exposure control device;
   an electric exposure control device;
   a battery for supplying electric power to said electric exposure control device and to said electromagnetic release device;
   manually operable exposure modes setting means; and
   exposure modes selecting means coupled with said exposure modes setting means and said exposure control devices for selectively enabling either one of said exposure control devices in accordance with the setting of said exposure modes setting means.

7. The improvement as defined in claim 6, wherein said release modes setting means and said exposure control modes setting means include a shutter dial so selectively settable that said release modes selecting means and said exposure control mode selecting means enable said electromagnetic release device and said electric exposure control device respectively when said shutter dial is set to an electric exposure control position and said mechanical release device and said mechanical exposure control device respectively when said shutter dial is set to a mechanical exposure control position.

8. The improvement as defined in claim 7, wherein said release modes selecting means includes a control member interlocked with said shutter dial and operable against said first locking means and said stroke restricting means for enabling said first locking means and disabling said stroke restricting means when said shutter dial is set to the mechanical exposure control position and for enabling said stroke restricting means and disabling said first locking means when said shutter dial is set to the electric exposure control position.

9. The improvement as defined in claim 8, further comprising:
- a self-timer including a mechanical retarding mechanism coupled with said mechanical release device for retarding the release of said shutter mechanism;
- manually operable means for setting said self-timer to a charge condition;
- a second release modes selecting device coupled with said self-timer setting means for enabling said first locking means and disabling said stroke restricting means when said self-timer is set, said second release modes selecting means being preemptive over said first release modes selecting device whereby said mechanical release device is operated due to the movement of said mechanical release initiating means beyond the restricted stroke whenever said self-timer is set.

10. The improvement as defined in claim 1, further comprising:
- a winding member movable from an initial position to a terminal position for winding-up a film and for charging said shutter mechanism;
- second locking means for locking said winding member at its initial position;
- means for releasing the locking of said winding member by said second locking means in response to the termination of an exposure; and
- means associatable with said mechanical release initiating means which has been moved beyond the restricted stroke, for retaining the locking of said winding member by said second locking means during the depression of said release member when said release modes setting means is set for the mechanical release mode.

11. The improvement as defined in claim 10, wherein said electromagnetic release device includes:
- a first and a second switch connected in series with one another, said first switch being closed only when said electromagnetic release initiating means is in the second position and the second switch being closed only when said winding member is in the initial position;
- an electromagnet excited through said first and second switches when in closed condition; and
- an actuating member for releasing said shutter mechanism due to the excitation of said electromagnet.

* * * * *

UNITED STATES PATENT AND TRADEMARK OFFICE
CERTIFICATE OF CORRECTION

PATENT NO. : 4,118,724
DATED : October 3, 1978
INVENTOR(S) : HIROSHI UEDA et al

It is certified that error appears in the above-identified patent and that said Letters Patent are hereby corrected as shown below:

[30] Foreign Application Priority Data

October 5, 1976   Japan...........51-120060

Signed and Sealed this

Third Day of April 1979

[SEAL]

Attest:

RUTH C. MASON
Attesting Officer

DONALD W. BANNER
Commissioner of Patents and Trademarks